(12) United States Patent
Xie et al.

(10) Patent No.: US 11,092,511 B2
(45) Date of Patent: Aug. 17, 2021

(54) DEVICE AND METHOD FOR MEASURING LENS CONTOUR BASED ON LASER WAVE NUMBER SCANNING

(71) Applicant: GUANGDONG UNIVERSITY OF TECHNOLOGY, Guangzhou (CN)

(72) Inventors: Shengli Xie, Guangzhou (CN); Kan Xie, Guangzhou (CN); Yanzhou Zhou, Guangzhou (CN); Haochuan Zhang, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 16/743,957

(22) Filed: Jan. 15, 2020

(65) Prior Publication Data

US 2020/0225115 A1 Jul. 16, 2020

(30) Foreign Application Priority Data

Jan. 15, 2019 (CN) .......................... 201910036201.X

(51) Int. Cl.
*G01M 11/02* (2006.01)
*G01B 9/02* (2006.01)

(52) U.S. Cl.
CPC ..... *G01M 11/0271* (2013.01); *G01B 9/02042* (2013.01)

(58) Field of Classification Search
CPC ............ G01B 9/02042; G01B 9/02005; G01B 11/2441; G01M 11/0271
See application file for complete search history.

(56) References Cited

U.S. PATENT DOCUMENTS

| 5,994,690 A | * | 11/1999 | Kulkarni | ............... | A61B 5/7257 250/216 |
| 2013/0132044 A1 | * | 5/2013 | Paris | ...................... | G02C 7/028 703/2 |
| 2019/0349223 A1 | * | 11/2019 | Pisupati | .................. | E21B 47/14 |

FOREIGN PATENT DOCUMENTS

| CN | 2577238 Y | 10/2003 |
| CN | 101033938 A | 9/2007 |

(Continued)

OTHER PUBLICATIONS

State Intellectual Property Office of the People's Republic of China, Office Action and Search Report Issued in Application No. 201910036201.X, dated Jul. 30, 2020, 24 pages. (Submitted with Partial Translation).

*Primary Examiner* — Jonathan M Hansen
(74) *Attorney, Agent, or Firm* — McCoy Russell LLP

(57) ABSTRACT

Provided is a device for measuring a lens three-dimensional profile based on laser wavenumber scanning, including: a semiconductor laser for emitting coherent light; a beam splitter for dividing the coherent light into two parts; an optical wedge; a CCD camera for capturing an interference image; a computer for processing image information; a laser controller for adjusting an operating temperature and an operating current of the semiconductor laser; and a bilateral telecentric lens. The coherent light is reflected by the optical wedge and then reaches the bilateral telecentric lens through the beam splitter, to form a first reflected light path. The coherent light is reflected by the measured lens, and then reaches the bilateral telecentric lens through the beam splitter, to form a second reflected light path. The first reflected light path and the second reflected light path form an interference image after passing through the bilateral telecentric lens.

5 Claims, 3 Drawing Sheets

(56) References Cited

FOREIGN PATENT DOCUMENTS

| | | |
|---|---|---|
| CN | 103528524 A | 1/2014 |
| CN | 105890538 A | 8/2016 |
| CN | 105928877 A | 9/2016 |
| CN | 108027319 A | 5/2018 |
| DE | 4405450 A1 | 8/1995 |
| JP | S6117908 A | 1/1986 |

* cited by examiner

DEVICE AND METHOD FOR MEASURING LENS CONTOUR BASED ON LASER WAVE NUMBER SCANNING

CROSS-REFERENCE TO RELATED APPLICATIONS

The present application claims priority to Chinese Patent Application No. 201910036201X filed on Jan. 15, 2019. The entire contents of the above-listed application is hereby incorporated by reference for all purposes.

TECHNICAL FIELD

The present disclosure relates to the technical field of optical element detection, and in particular, to a device and a method for measuring a lens three-dimensional profile based on laser wavenumber scanning.

BACKGROUND

With the continuous development of science and technology, an application range of optical elements is increasingly becoming wider, and requirements for processing accuracy of the optical elements are becoming higher and higher. In an optical system, a lens is one of the most common optical elements. Three-dimensional profile information of the lens is a factor affecting its optical performance, and once the optical performance is not up to standard, it will have a great negative impact on the entire optical system. Therefore, it is an important link in a lens production process to verify whether the three-dimensional profile of the lens meets the standards.

At present, methods for measuring the lens three-dimensional profile include a phase-shift interference method, a scanning probe microscope measuring method, an optical coherence tomography profile measuring method and so on. The phase-shift interference method uses a principle of light wave interference to detect surface topography of an object, and performs calculation to obtain the surface topography by measuring spatial variation, in a light field, of an optical distance difference (a front phase difference of an interference wave) which changes due to modulation on the surface topography of the object, but it is uneasy to achieve high-precision measurement of the lens three-dimensional profile. The scanning probe microscope measuring method is scanning measurement and finally gives the surface topography on an entire measured area. It has high measurement accuracy, and longitudinal and transverse resolutions reach up to an atomic level, while the measurement range, both transverse and longitudinal, is very narrow. In addition, it involves many technical problems, complicated operations, high environmental requirements, slow image acquisition speeds, and complicated and expensive experimental equipment.

Therefore, the existing technology needs to be further improved and refined.

SUMMARY

An object of the present disclosure is to overcome shortcomings of the existing technology, by providing a device for measuring a lens three-dimensional profile based on laser wavenumber scanning, which has good stability, short measurement time and relatively high measurement accuracy.

Another object of the present disclosure is to overcome the shortcomings of the existing technology by providing a measuring method based on the measuring device above.

The object of the present disclosure is achieved by the following technical solutions. In an aspect of the present disclosure, a device for measuring a lens three-dimensional profile based on laser wavenumber scanning is provided, which includes: a semiconductor laser configured to emit coherent light; a beam splitter configured to divide the coherent light into two parts; an optical wedge; a CCD camera configured to capture an interference image; a computer configured to process image information; a laser controller configured to adjust an operating temperature and an operating current of the semiconductor laser; and a bilateral telecentric lens for precision inspection. The semiconductor laser, the bilateral telecentric lens, the optical wedge, and a measured lens are sequentially arranged in a counterclockwise direction, and the beam splitter is located at a center position. The coherent light is emitted from the semiconductor laser, and then reaches the optical wedge through the beam splitter, to form a first incident light path; the coherent light is reflected by the optical wedge and then reaches the bilateral telecentric lens through the beam splitter, to form a first reflected light path; the coherent light is emitted from the semiconductor laser and then reaches the measured lens through the beam splitter, to form a second incident light path; the coherent light is reflected by the measured lens, and then reaches the bilateral telecentric lens through the beam splitter, to form a second reflected light path; and the first reflected light path and the second reflected light path form an interference image after passing through the bilateral telecentric lens. The CCD camera is disposed behind the bilateral telecentric lens, to obtain image data of the interference image; the laser controller is electrically connected to the semiconductor laser; and the computer is electrically connected to the CCD camera and the laser controller, respectively.

Further, in order to expand applications of the measuring device, the CCD camera is a CMOS camera with a high imaging quality.

Further, in order to further broaden the applications of the measuring device, the computer is a desktop computer or an all-in-one computer capable of receiving interference images captured by the CCD camera and processing the interference images.

In an implementation, in order to make a density of a generated reference interference fringe moderate and for sake of easy measurement, the optical wedge has a center thickness of 6 mm and a wedge angle of 6 degrees.

Specifically, the computer further comprises an acquisition module and a data processing module; the acquisition module is connected to the CCD camera and the laser controller respectively and configured to control acquisition quantity, an exposure time and sampling interval time of the CCD camera and monitor the laser controller; the data processing module is connected to the acquisition module and configured to perform data processing on the interference image captured by the CCD camera, the data processing comprising data cutting, using interference signal correlation spectral decomposition and complex linear least squares algorithm, unwrapping phase and three-dimensional reconstruction.

The other object of the present disclosure can be achieved by the following technical solutions: a method for measuring a lens three-dimensional profile based on laser wavenumber scanning, which includes following steps:

step S1 of using a Tsai method to perform camera calibration before a CCD camera acquires data;

step S2 of a computer controlling an exposure time, acquisition interval time and acquisition quantity of the CCD camera, and setting a coherent value of a laser controller;

step S3 of the laser controller controlling an operating current of a semiconductor laser in such a manner that the semiconductor laser emits coherent light for wavenumber scanning;

step S4 of a beam splitter dividing the coherent light from the semiconductor laser into irradiating light that irradiates a measured lens and irradiating light that irradiates an optical wedge, and making reflected light from the measured lens and the optical wedge generate interference;

step S5 of the CCD camera capturing an interference image of the reflected light that comes from the measured lens and the optical wedge and passes through a bilateral telecentric lens;

step S6 of the computer performing data cutting on data acquired by the CCD camera and performing blind separation on interference signals using an interference signal correlation spectral decomposition and complex linear least squares algorithm;

step S7 of extracting an interference phase of a result obtained in the step S6, and obtaining three-dimensional profile structure information of the measured lens by demodulating the interference phase; and $$Q = A \cdot G + W$$

$$A = \begin{bmatrix} 1 & 1 & \cdots & 1 & 1 & \cdots & 1 & 1 \\ e^{j \cdot 2\pi \cdot f_{12} \frac{\Delta k}{N-1}} & e^{-j \cdot 2\pi \cdot f_{12} \frac{\Delta k}{N-1}} & \cdots & e^{j \cdot 2\pi \cdot f_{pq} \frac{\Delta k}{N-1}} & e^{-j \cdot 2\pi \cdot f_{pq} \frac{\Delta k}{N-1}} & \cdots & e^{j \cdot 2\pi \cdot f_{(M-1)(M)} \frac{\Delta k}{N-1}} & e^{-j \cdot 2\pi \cdot f_{(M-1)(M)} \frac{\Delta k}{N-1}} \\ e^{j \cdot 2\pi \cdot f_{12} \frac{2\Delta k}{N-1}} & e^{-j \cdot 2\pi \cdot f_{12} \frac{2\Delta k}{N-1}} & \cdots & e^{j \cdot 2\pi \cdot f_{pq} \frac{2\Delta k}{N-1}} & e^{-j \cdot 2\pi \cdot f_{pq} \frac{2\Delta k}{N-1}} & \cdots & e^{j \cdot 2\pi \cdot f_{(M-1)(M)} \frac{2\Delta k}{N-1}} & e^{-j \cdot 2\pi \cdot f_{(M-1)(M)} \frac{2\Delta k}{N-1}} \\ \cdots & \cdots & \cdots & \cdots & \cdots & \cdots & \cdots & \cdots \\ e^{j \cdot 2\pi \cdot f_{12} \cdot \Delta k} & e^{-j \cdot 2\pi \cdot f_{12} \cdot \Delta k} & \cdots & e^{j \cdot 2\pi \cdot f_{pq} \cdot \Delta k} & e^{-j \cdot 2\pi \cdot f_{pq} \cdot \Delta k} & \cdots & e^{j \cdot 2\pi \cdot f_{(M-1)(M)} \Delta k} & e^{-j \cdot 2\pi \cdot f_{(M-1)(M)} \Delta k} \end{bmatrix}_{N \times M \cdot (M-1)}$$

$$G = \left[ \sqrt{I_1 I_2} \cdot e^{-j\phi_{12}}, \sqrt{I_1 I_2} \cdot e^{j\phi_{12}}, \ldots, \sqrt{I_p I_q} \cdot e^{-j\phi_{pq}}, \sqrt{I_p I_q} \cdot e^{j\phi_{pq}}, \ldots, \sqrt{I_{M-1} I_M} \cdot e^{-j\phi_{(M-1)M}}, \sqrt{I_{M-1} I_M} \cdot e^{j\phi_{(M-1)M}} \right]^H_{1 \times (M-1) \cdot M}$$

$$W = [W_{(1)}, W_{(2)}, \ldots, W_{(N)}]^T_{1 \times N}$$

step S8 of performing three-dimensional reconstruction on the three-dimensional profile data of the lens to obtain a three-dimensional profile map of the lens, wherein least square fitting is performed on the profile data of the measured lens in order to verify whether the profile measurement data is accurate and an accuracy of a profile measuring device.

Specifically, in this method, a linearly modulated laser is used to perform wavenumber scanning, and an output wavenumber that changes with time is expressed a:

$$K(n) = K_0 + \Delta k \cdot (n-1)/M,$$

where $K_0$ represents a wavenumber value initially output by a laser, $\Delta K$ represents a range of the laser wavenumber scanning, M represents a number of images captured by a camera, and n is 1, 2, ..., M.

Specifically, a spectrum intensity of the interference image captured by the CCD camera is a light intensity of an interference image obtained by superimposing of reflected light from four surfaces comprising front and rear surfaces $S_1$ and $S_2$ of the optical wedge and front and rear surfaces $S_3$ and $S_4$ of the measured lens, and is expressed as:

$$I(x, y, k(t)) = \sum_{n=1}^{4} I_n(x, y) + 2 \sum_{p=1}^{3} \sum_{q=p+1}^{4} \sqrt{I_p(x, y) \cdot I_q(x, y)} \cos[2 \cdot k(t) \cdot \Lambda_{pq}(x, y)],$$

$$\Lambda_{pq}(x, y) = n_{pq} \cdot z_{pq}(x, y),$$

where $I_1$, $I_2$, $I_3$, and $I_4$ respectively represent light intensities of reflected light of four surfaces comprising the front and rear surfaces $S_1$ and $S_2$ of the optical wedge and the front and rear surfaces $S_3$ and $S_4$ of a measured object; $\Lambda_{pq}$ represents an optical distance difference from a surface $S_p$ to a surface $S_q$; $n_{pq}$ represents an average refractive index from the surface $S_p$ to the surface $S_q$; and $z_{pq}$ represents a position difference between the surfaces $S_p$ and $S_q$.

Specifically, after the data processing is performed on the data acquired by the CCD camera using the interference signal correlation spectral decomposition and complex linear least squares algorithm, an interference phase $\Phi_{13}$ is extracted and demodulated, and a theory of the interference signal correlation spectral decomposition and complex linear least squares is as follow:

after removing a direct-current component of the interference signal acquired by the CCD camera, a Euler formula is rewritten into a matrix form to obtain following formulas:

where an coefficient matrix A contains interference frequency information, a vector G contains interference phase and interference amplitude information, a vector W represents noise introduced during acquisition by the CCD camera, M is a total number of surfaces of the optical wedge and the measured lens that is 4, N is a number of shots by the CCD camera, and a vector Q represents an intensity of the interference image captured by the CCD camera, and the matrix A and the vector G are solved through the vector Q, and interference signals between respective surfaces are obtained by separation, so that the interference phase $\Phi_{13}$ containing lens profile structure information is obtained by separation.

Specifically, a medium between a front surface $S_1$ of the optical wedge and a front surface $S_3$ of the measured lens is air, and a refractive index is set to 1, since:

$$\Phi_{13} = 2 \cdot k_0 \cdot \Lambda_{13},$$

a profile $z_{13}$ of the front surface $S_3$ of the measured lens is expressed a:

$$z_{13}(x,y) = \Phi_{13}(x,y)/(2 \cdot k_0).$$

The three-dimensional reconstruction is performed on the lens three-dimensional profile data to obtain a lens three-dimensional profile map.

The operating process and principle of the present disclosure are as follows: when the device is measuring, a change of about 10 mA of the operating current can result in a high-precision profile of the lens, and there is no mechanical contact with the lens surface, avoiding damage to the lens surface. By using the interference signal correlation spectral decomposition and complex linear least squares algorithm in the data processing process, the interference phase of each surface can be accurately and blindly obtained by separation for the interference signal, thereby avoiding a blurring effect of Fourier transform window function convolution and improving the measurement accuracy. The present disclosure also has advantages of simple structure, convenient operation and easy implementation.

Compared with the existing technology, the present disclosure also has following advantages:

(1) the device for measuring a lens three-dimensional profile based on laser wavenumber scanning according to the present disclosure can obtain the high-precision profile structure information of the lens through acquiring the interference image and performing data processing, and it has characteristics of good stability, non-contact and no damage;

(2) compared with the existing technology, the device for measuring a lens three-dimensional profile based on laser wavenumber scanning according to the present disclosure has good stability and has the advantages of non-contact, no damage, high-precision profile measurement and so on; and (3) the device for measuring a lens three-dimensional profile based on laser wavenumber scanning according to the present disclosure, on basis of the laser wavenumber scanning technology, can obtain the lens three-dimensional profile structure information by acquiring the interference image and performing related data processing steps such as interference signal correlation spectral decomposition and complex linear least squares algorithm, and it has the advantages of non-contact, no damage, high-precision profile measurement and so on.

DESCRIPTION OF REFERENCE NUMERALS IN THE ABOVE DRAWINGS

1: semiconductor laser, 2: beam splitter, 3: measured lens, 4: optical wedge, 5: CCD camera, 6: computer, 7: laser controller, 8: bilateral telecentric lens.

DESCRIPTION OF EMBODIMENTS

In order to make the objectives, technical solutions, and advantages of the present disclosure clearer and more specific, the present disclosure is further described below with reference to the accompanying drawings and embodiments.

Embodiment 1

Figure 1:
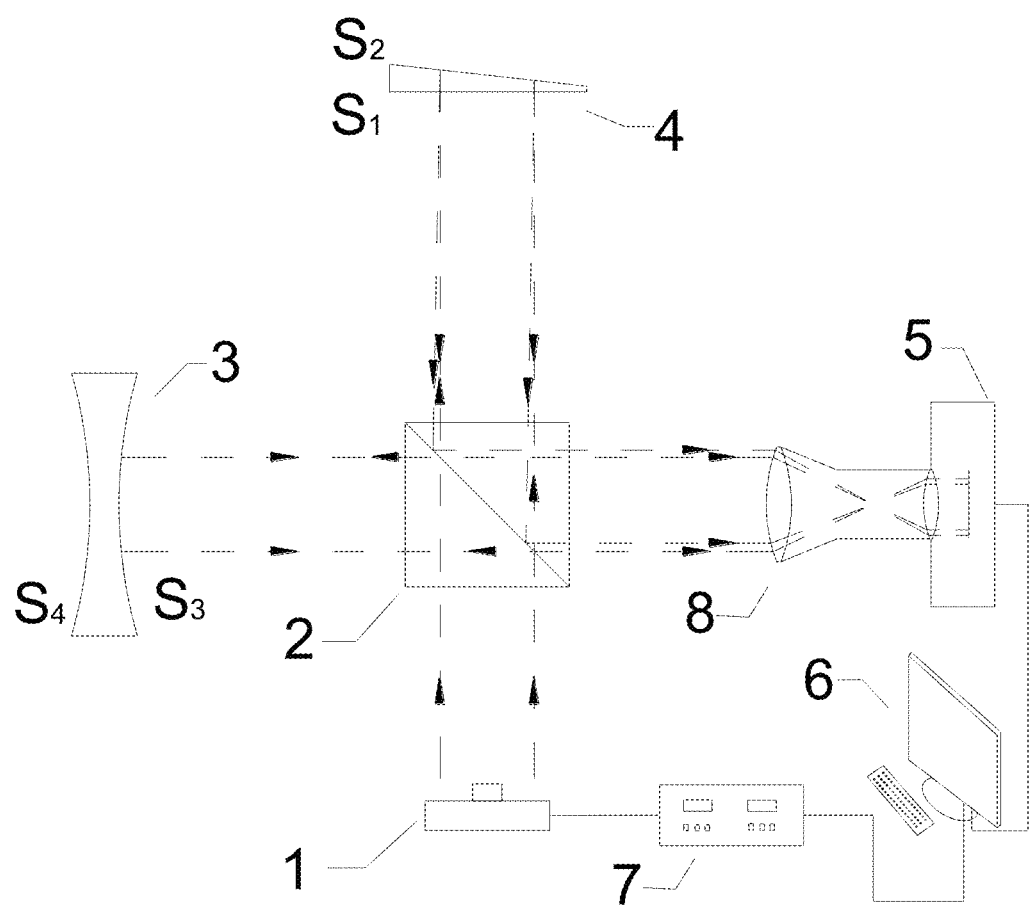
FIG. 1 is a schematic structural diagram of a device for measuring lens three-dimensional profile based on laser wavenumber scanning according to the present disclosure.
Figure 2:
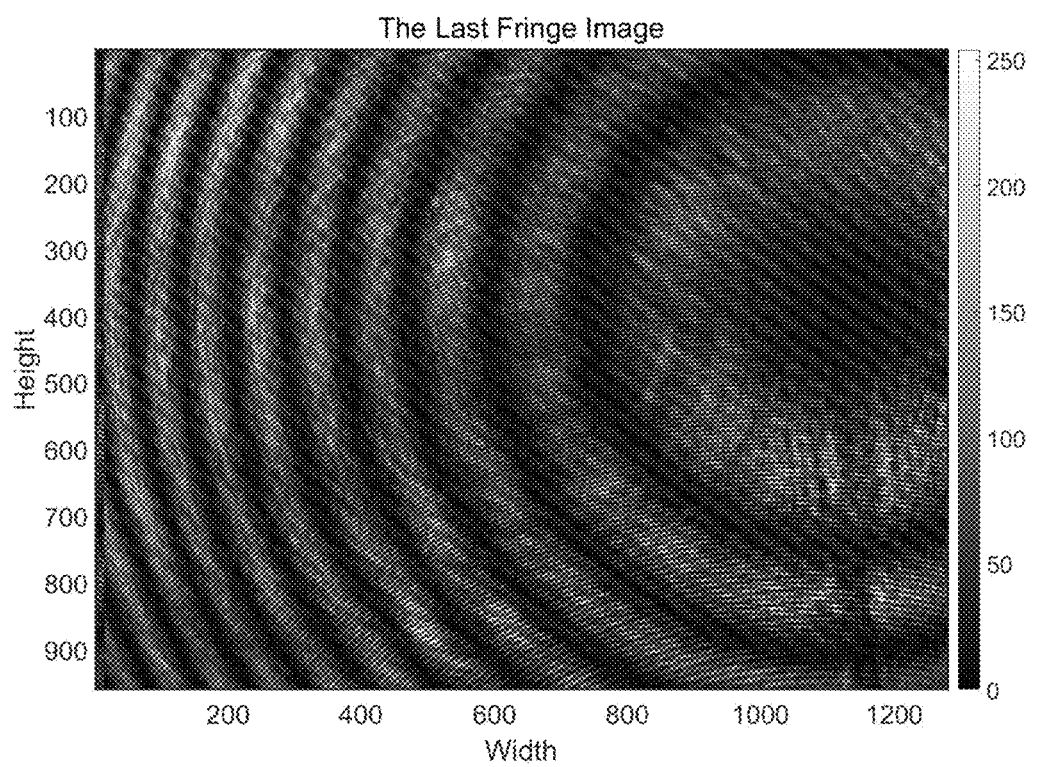
FIG. 2 is one frame of interference images captured by a CCD camera according to the present disclosure.
Figure 3:
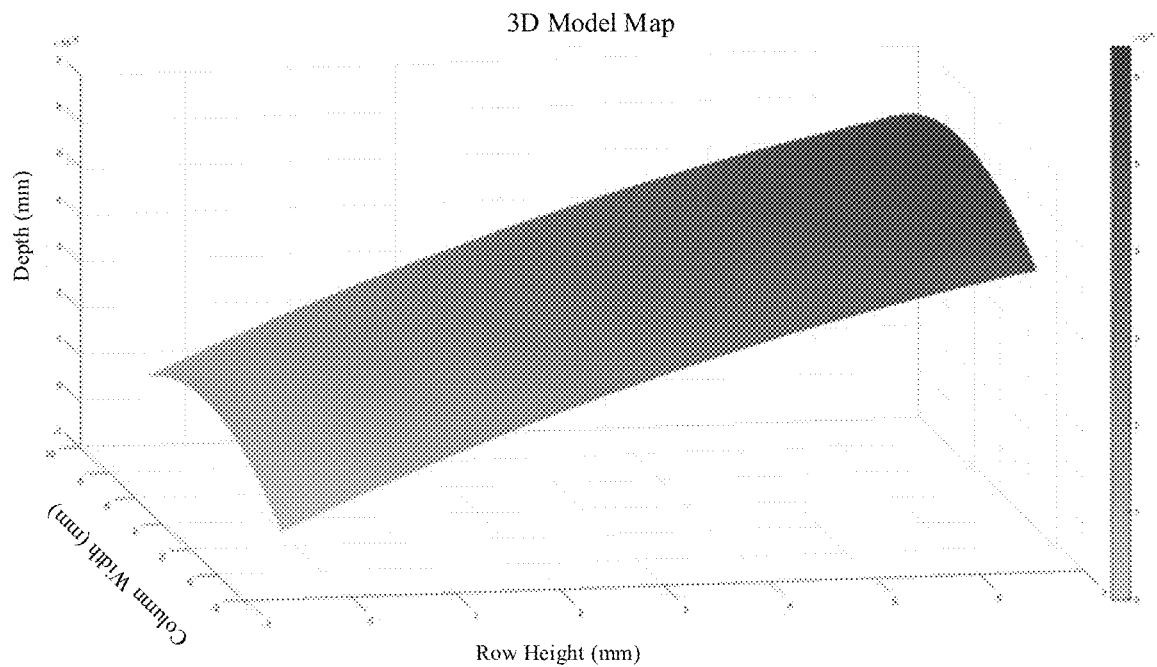
FIG. 3 is a three-dimensional reconstruction diagram of a measured lens according to the present disclosure.

As shown in FIG. 1 to FIG. 3, the present embodiment discloses a device for measuring lens three-dimensional profile based on laser wavenumber scanning. The device mainly includes a semiconductor laser 1 for emitting coherent light, a beam splitter 2 for dividing the coherent light into two parts, an optical wedge 4, a CCD camera 5 for capturing an interference image, a computer 6 for processing image information, a laser controller 7 for adjusting an operating temperature and an operating current of the semiconductor laser 1, and a bilateral telecentric lens 8 for precision inspection.

Specifically, the semiconductor laser 1, the bilateral telecentric lens 8, the optical wedge 4, and a measured lens 3 are sequentially arranged in a counterclockwise direction, and the beam splitter 2 is located at a center position. The coherent light is emitted from the semiconductor laser 1, and then reaches the optical wedge 4 through the beam splitter 2, to form a first incident light path. The coherent light is reflected by the optical wedge 4 and then reaches the bilateral telecentric lens 8 through the beam splitter 2, to form a first reflected light path. The coherent light is emitted from the semiconductor laser 1 and then reaches the measured lens 3 through the beam splitter 2, to form a second incident light path. The coherent light is reflected by the measured lens 3 and then reaches the bilateral telecentric lens 8 through the beam splitter 2, to form a second reflected light path. The first reflected light path and the second reflected light path form an interference image after passing through the bilateral telecentric lens.

Specifically, the CCD camera 5 is disposed behind the bilateral telecentric lens 8, to obtain image data of the interference image. The laser controller 7 is electrically connected to the semiconductor laser 1. The computer 6 is electrically connected to the CCD camera 5 and the laser controller 7, respectively.

Further, in order to expand applications of the measuring device, the CCD camera 5 of the present disclosure may be replaced by a CMOS camera with a high imaging quality.

Further, in order to further broaden the applications of the measuring device, the computer 6 according to the present disclosure may be a desktop computer or an all-in-one computer capable of receiving interference images captured by the CCD camera 5 and processing the interference images.

As an example, in order to make a density of a generated reference interference fringe moderate and for sake of easy measurement, the optical wedge 4 according to the present disclosure may be set to have a center thickness of 6 mm and a wedge angle of 6 degrees.

Specifically, the computer 6 further includes an acquisition module and a data processing module. The acquisition module is connected to the CCD camera 5 and the laser controller 7 respectively, for controlling acquisition quantity, an exposure time and sampling interval time of the CCD camera 5 and monitoring the laser controller 7. The data processing module is connected to the acquisition module and performs data processing on the interference image acquired by the CCD camera 5, including data cutting, using an interference signal correlation spectral decomposition and complex linear least squares algorithm, unwrapping phase and three-dimensional reconstruction.

Figure 4:
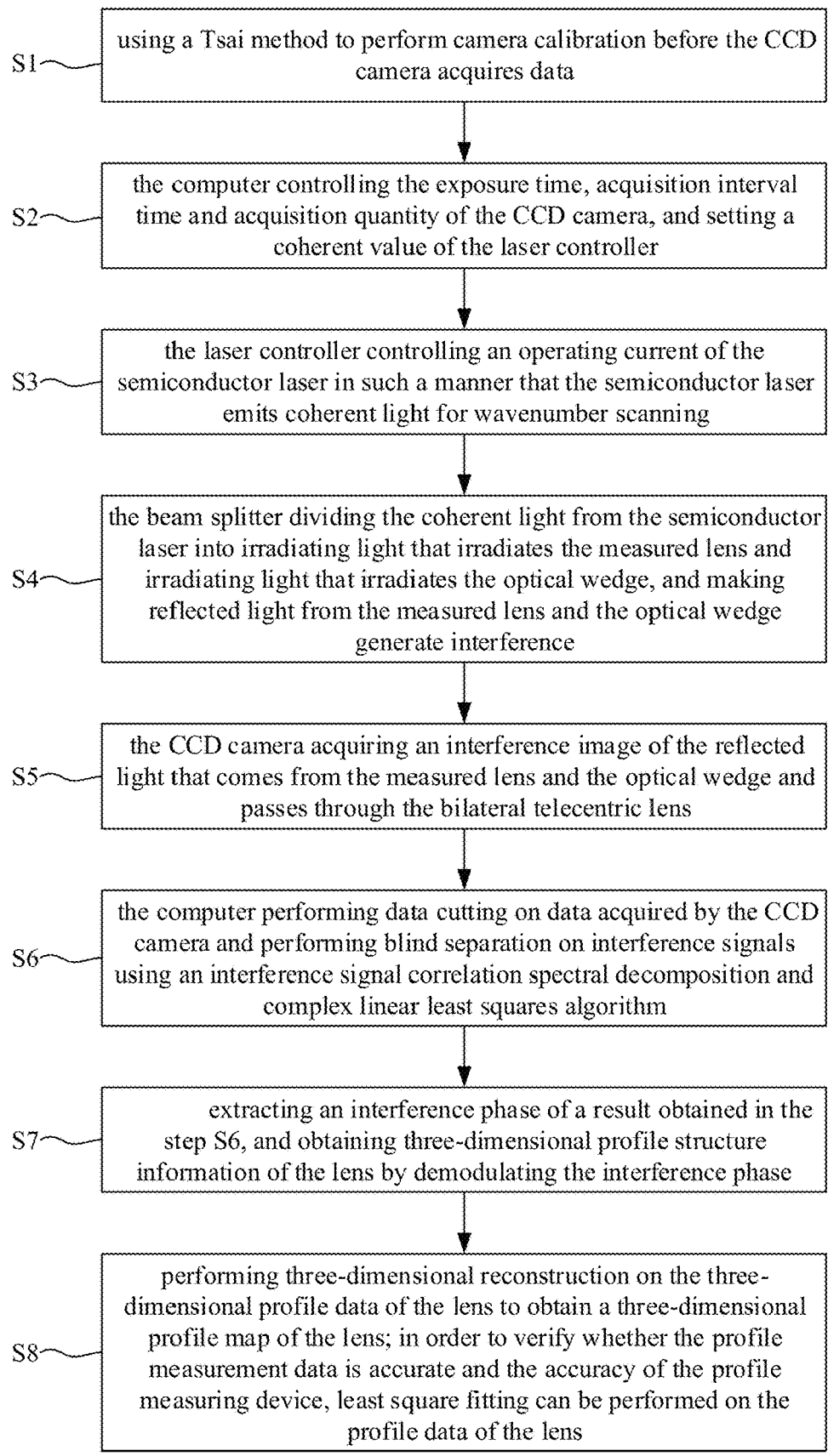
FIG. 4 is a flowchart of a method for measuring lens three-dimensional profile laser wavenumber scanning according to the present disclosure.

As shown in FIG. 4, the present embodiment further discloses a method for measuring lens three-dimensional profile based on laser wavenumber scanning. The method includes following steps:

step S1 of using a Tsai method to perform camera calibration before the CCD camera 5 acquires data;

step S2 of the computer 6 controlling the exposure time, acquisition interval time and acquisition quantity of the CCD camera 5, and setting a coherent value of the laser controller 7;

step S3 of the laser controller 7 controlling an operating current of the semiconductor laser 1 in such a manner that the semiconductor laser 1 emits coherent light for wavenumber scanning;

step S4 of the beam splitter 2 dividing the coherent light from the semiconductor laser 1 into irradiating light that irradiates the measured lens 3 and irradiating light that irradiates the optical wedge 4, and making reflected light from the measured lens 3 and the optical wedge 4 generate interference;

step S5 of the CCD camera 5 acquiring an interference image of the reflected light that comes from the measured lens 3 and the optical wedge 4 and passes through the bilateral telecentric lens;

step S6 of the computer 6 performing data cutting on data acquired by the CCD camera 5 and performing blind separation on interference signals using an interference signal correlation spectral decomposition and complex linear least squares algorithm;

step S7 of extracting an interference phase of a result obtained in the step S6, and obtaining three-dimensional profile structure information of the lens by demodulating the interference phase; and an interference image obtained by superimposing of reflected light from four surfaces including front and rear surfaces $S_1$ and $S_2$ of the optical wedge 4 and front and rear surfaces $S_3$ and $S_4$ of the lens, and it is expressed as:

$$I(x, y, k(t)) = \sum_{n=1}^{4} I_n(x, y) + 2\sum_{p=1}^{3}\sum_{q=p+1}^{4} \sqrt{I_p(x, y) \cdot I_q(x, y)} \cos[2 \cdot k(t) \cdot \Lambda_{pq}(x, y)]$$

$$\Lambda_{pq}(x, y) = n_{pq} \cdot z_{pq}(x, y),$$

where $I_1$, $I_2$, $I_3$, and $I_4$ respectively represent light intensities of reflected light of four surfaces including the front and rear surfaces $S_1$ and $S_2$ of the optical wedge 4 and the front surfaces $S_3$ and $S_4$ of the measured object; $\Lambda_{pq}$ represents an optical distance difference from a surface $S_p$ to a surface $S_q$; $n_{pq}$ represent an average refractive index from the surface $S_p$ to the surface $S_q$; and $z_{pq}$ represent a position difference between the surfaces $S_p$ and $S_q$.

After the data processing is performed on the data acquired by the CCD camera 5 by using the interference signal correlation spectral decomposition and complex linear least squares algorithm, an interference phase $\Phi_{13}$ is extracted and demodulated. A theory of the interference signal correlation spectral decomposition and complex linear least squares is described as follows.

After removing a direct-current component from the interference signal acquired by the CCD camera 5, a Euler formula is rewritten into a matrix form to obtain following formulas:

$$Q = A \cdot G + W$$

$$A = \begin{bmatrix} 1 & 1 & \ldots & 1 & 1 & \ldots & 1 & 1 \\ e^{j \cdot 2\pi \cdot f_{12} \frac{\Delta k}{N-1}} & e^{-j \cdot 2\pi \cdot f_{12} \frac{\Delta k}{N-1}} & \ldots & e^{j \cdot 2\pi \cdot f_{pq} \frac{\Delta k}{N-1}} & e^{-j \cdot 2\pi \cdot f_{pq} \frac{\Delta k}{N-1}} & \ldots & e^{j \cdot 2\pi \cdot f(M-1)(M) \frac{\Delta k}{N-1}} & e^{-j \cdot 2\pi \cdot f(M-1)(M) \frac{\Delta k}{N-1}} \\ e^{j \cdot 2\pi \cdot f_{12} \frac{2\Delta k}{N-1}} & e^{-j \cdot 2\pi \cdot f_{12} \frac{2\Delta k}{N-1}} & \ldots & e^{j \cdot 2\pi \cdot f_{pq} \frac{2\Delta k}{N-1}} & e^{-j \cdot 2\pi \cdot f_{pq} \frac{2\Delta k}{N-1}} & \ldots & e^{j \cdot 2\pi \cdot f(M-1)(M) \frac{2\Delta k}{N-1}} & e^{-j \cdot 2\pi \cdot f(M-1)(M) \frac{2\Delta k}{N-1}} \\ \ldots & \ldots & \ldots & \ldots & \ldots & \ldots & \ldots & \ldots \\ e^{j \cdot 2\pi \cdot f_{12} \cdot \Delta k} & e^{-j \cdot 2\pi \cdot f_{12} \cdot \Delta k} & \ldots & e^{j \cdot 2\pi \cdot f_{pq} \cdot \Delta k} & e^{-j \cdot 2\pi \cdot f_{pq} \cdot \Delta k} & \ldots & e^{j \cdot 2\pi \cdot f(M-1)(M) \cdot \Delta k} & e^{-j \cdot 2\pi \cdot f(M-1)(M) \cdot \Delta k} \end{bmatrix}_{N \times M \cdot (M-1)}$$

$$G = \left[ \sqrt{I_1 I_2} \cdot e^{-j\phi_{12}}, \sqrt{I_1 I_2} \cdot e^{j\phi_{12}}, \ldots, \sqrt{I_p I_q} \cdot e^{-j\phi_{pq}}, \sqrt{I_p I_q} \cdot e^{j\phi_{pq}}, \ldots, \sqrt{I_{M-1} I_M} \cdot e^{-j\phi(M-1)M}, \sqrt{I_{M-1} I_M} \cdot e^{j\phi(M-1)M} \right]^H_{1 \times (M-1)M}$$

$$W = [W_{(1)}, W_{(2)}, \ldots, W_{(N)}]^T_{1 \times N}$$

step S8 of performing three-dimensional reconstruction on the three-dimensional profile data of the lens to obtain a three-dimensional profile map of the lens. In order to verify whether the profile measurement data is accurate and the accuracy of the profile measuring device, least square fitting can be performed on the profile data of the lens.

Specifically, in this method, a linearly modulated laser is used to perform wavenumber scanning, and the output wavenumber that changes with time is expressed as:

$$K(n) = K_0 + \Delta k \cdot (n-1)/M.$$

In the formula, $K_0$ represents a wavenumber value initially output by the laser, $\Delta K$ represents a range of the laser wavenumber scanning, M represents a number of images captured by the camera, and n is 1, 2, ..., M.

Specifically, a spectrum intensity of the interference image captured by the CCD camera 5 is a light intensity of where the coefficient matrix A contains interference frequency information, the vector G contains Interference phase and interference amplitude information, the vector W represents noise introduced during the acquisition by the CCD camera 5, M is a total number of the surfaces of the optical wedge 4 and the lens that is 4, N is a number of shots by the CCD camera 5, and the vector Q represents the intensity of the interference image captured by the CCD camera 5. The matrix A and the vector G can be solved through the vector Q, and interference signals between respective surfaces are obtained by separation, so that the interference phase $\Phi_{13}$ containing the lens profile structure information can be obtained by separation.

Specifically, a medium between the front surface $S_1$ of the optical wedge 4 and the front surface $S_3$ of the lens is air, and the refractive index is set to 1, since:

$$\Phi_{13} = 2 \cdot k_0 \cdot \Lambda_{13},$$

a profile $z_{13}$ of the front surface $S_3$ of the lens can be expressed as:

$$z_{13}(x,y)=\Phi_{13}(x,y)/(2\cdot k_0).$$

The three-dimensional reconstruction is performed on the lens three-dimensional profile data to obtain a lens three-dimensional profile map.

The operating process and principle of the present disclosure will be described as follows. When the device is performing measurement, a change of about 10 mA of the operating current can result in a high-precision profile of the lens, and there is no mechanical contact with a surface of the lens, thereby avoiding damage to the surface of the lens. By using the interference signal correlation spectral decomposition and complex linear least squares algorithm in the data processing process, the interference phase of each surface can be accurately and blindly obtained by separation for the interference signal, thereby avoiding a blurring effect of Fourier transform window function convolution and improving the measurement accuracy. The present disclosure also has advantages of simple structure, convenient operation and easy implementation.

Embodiment 2

Referring to FIG. 1 to FIG. 4, a device for measuring a lens three-dimensional profile based on laser wavenumber scanning according to the present embodiment includes a semiconductor laser 1, a beam splitter 2, a lens, an optical wedge 4, a CCD camera 5, a bilateral telecentric lens 8, a computer 6, and a laser controller 7. A model of the semiconductor laser 1 may be HL63603TG. The optical wedge 4 may have a center thickness of 6 mm and a wedge angle of 6 degrees.

Measurement steps and principles of the present embodiment will be described as follows:

(1): using a Tsai method to perform camera calibration before the CCD camera acquires data;

(2): the computer 6 controlling the exposure time, acquisition interval time and acquisition quantity of the CCD camera 5; and setting a coherent value of the laser controller 7;

(3): the laser controller 7 controlling the operating current of the semiconductor laser 1 in such a manner that the semiconductor laser 1 emits coherent light for wavenumber scanning, where the operating current changing by about 10 mA;

(4): the beam splitter 2 dividing the coherent light from the semiconductor laser 1 into irradiating light that irradiates the lens and irradiating light that irradiates the optical wedge 4, and making the reflected light from the lens and the optical wedge 4 generate interference;

(5): the CCD camera 5 acquiring an interference image of the reflected light that comes from the lens 3 and the optical wedge 4 and passes through the bilateral telecentric lens;

(6): the computer 6 performing data cutting on data acquired by the CCD camera 5 and performing blind separation on interference signals using the interference signal correlation spectral decomposition and complex linear least squares algorithm;

(7): extracting an interference phase of a demodulation result obtained in the step 6, and obtaining three-dimensional profile structure information of the lens by demodulating the interference phase; and (8): performing three-dimensional reconstruction on the three-dimensional profile data of the lens to obtain a three-dimensional profile map of the lens; in order to verify whether the profile measurement data is accurate and the accuracy of the profile measuring device, least square fitting can be performed on the profile data of the lens.

In the above steps, a two-dimensional Fourier transform is performed on the interference image, then the phase of the interference signal of the front and rear surfaces of the optical wedge 4 is extracted and correlation processing is performed on the interference phase, so as to monitor online whether a mode jump occurs for the wavenumber. In this method, the wavenumber scanning is performed by changing the operating current of the laser to linearly modulate the laser output, and the output wavenumber that changes with time can be expressed as:

$$K(n)=K_0+\Delta k\cdot(n-1)/M.$$

In the formula, $K_0=7.308\times10^6$ m$^{-1}$ is the wavenumber value initially output by the laser; $\Delta K=10^3$ m$^{-1}$ is the range of the laser wavenumber scanning; M is the number of images acquired by the camera, which is 400; and n is 1, 2, ..., M.

The computer 6 is connected to the CCD camera 5 via a Gigabit Ethernet, to control and perform data transmission, so that the computer 6 can obtain an interference image. A spectrum intensity of the interference image captured by the CCD camera 5 is a light intensity of the interference image obtained by superimposing of reflected light from four surfaces including front and rear surfaces $S_1$ and $S_2$ of the optical wedge 4 and front and rear surfaces $S_3$ and $S_4$ of the lens, and it is expressed as:

$$I(x, y, k(t)) = \sum_{n=1}^{4} I_n(x, y) + 2\sum_{p=1}^{3}\sum_{q=p+1}^{4} \sqrt{I_p(x, y)\cdot I_q(x, y)} \cos[2\cdot k(t)\cdot \Lambda_{pq}(x, y)]$$

$$\Lambda_{pq}(x, y) = n_{pq}\cdot z_{pq}(x, y),$$

where $I_1$, $I_2$, $I_3$, and $I_4$ respectively represent light intensities of reflected light of four surfaces including the front and rear surfaces $S_1$ and $S_2$ of the optical wedge 4 and the surfaces $S_3$ and $S_4$ of the measured object; $\Lambda_{pq}$ represents an optical distance difference from a surface $S_p$ to a surface $S_q$; $n_{pq}$ represents an average refractive index from the surface $S_p$ to the surface $S_q$; and $z_{pq}$ represents a position difference between the surfaces $S_p$ and $S_q$.

After interference signal blind separation is performed on the interference image acquired by the CCD camera 5 by using the interference signal correlation spectral decomposition and complex linear least squares algorithm, the interference phase $\Phi_{13}$ of the front surface $S_1$ of the optical wedge 4 and the front surface $S_3$ of the lens is extracted and demodulated. A medium between the front surface $S_1$ of the optical wedge 4 and the front surface $S_3$ of the lens is air, and the refractive index can be considered to be 1. Since:

$$\Phi_{13}=2\cdot k_0\cdot\Lambda_{13},$$

a profile $z_{13}$ of the front surface $S_3$ of the lens can be expressed as:

$$z_{13}(x,y)=\Phi_{13}(x,y)/(2\cdot k_0).$$

The three-dimensional reconstruction is performed on the three-dimensional profile data of the lens according to the $Z_{13}$ (x, y) expression to obtain a three-dimensional profile map of the lens. In order to verify whether the profile measurement data is accurate and the accuracy of the profile measuring device, least squares fitting can be performed on the profile data of the lens. The present embodiment, based on the laser wavenumber scanning technology, can obtain the lens three-dimensional profile structure information by acquiring the interference image and performing related data processing steps such as interference signal correlation spectral decomposition and complex linear least squares algorithm, and it has the advantages of non-contact, no damage, high-precision profile measurement and so on.

The above embodiments are preferred embodiments of the present disclosure, but the embodiments of the present disclosure are not limited by the above embodiments. Any other changes, modifications, substitutions, combinations, and simplifications made without departing from the spirit and principle of the present disclosure should be equivalent replacement methods and all are included in the protection scope of the present disclosure.

What is claimed is:

1. A method for measuring a lens three-dimensional profile based on laser wavenumber scanning, comprising:
    step S1 of using a Tsai method to perform camera calibration before a CCD camera acquires data;
    step S2 of a computer controlling an exposure time, acquisition interval time and acquisition quantity of the CCD camera, and setting a coherent value of a laser controller;
    step S3 of the laser controller controlling an operating current of a semiconductor laser in such a manner that the semiconductor laser emits coherent light for wavenumber scanning;
    step S4 of a beam splitter dividing the coherent light from the semiconductor laser into irradiating light that irradiates a measured lens and irradiating light that irradiates an optical wedge, and making reflected light from the measured lens and the optical wedge generate interference;
    step S5 of the CCD camera capturing an interference image of the reflected light that comes from the measured lens and the optical wedge and passes through a bilateral telecentric lens;
    step S6 of the computer performing data cutting on data acquired by the CCD camera and performing blind separation on interference signals using an interference signal correlation spectral decomposition and complex linear least squares algorithm;
    step S7 of extracting an interference phase of a result obtained in the step S6, and obtaining three-dimensional profile structure information of the measured lens by demodulating the interference phase; and
    step S8 of performing three-dimensional reconstruction on the three-dimensional profile data of the lens to obtain a three-dimensional profile map of the lens, wherein least square fitting is performed on the profile data of the measured lens in order to verify whether the profile measurement data is accurate and an accuracy of a profile measuring device.

2. The method according to claim 1, wherein a linearly modulated laser is used to perform wavenumber scanning, and an output wavenumber that changes with time is expressed as:

$$K(n) = K_0 + \Delta k \cdot (n-1)/M,$$

where $K_0$ represents a wavenumber value initially output by a laser, $\Delta K$ represents a range of the laser wavenumber scanning, M represents a number of images captured by a camera, and n is 1, 2, ..., M.

3. The method according to claim 1, wherein a spectrum intensity of the interference image captured by the CCD camera is a light intensity of an interference image obtained by superimposing of reflected light from four surfaces comprising front and rear surfaces $S_1$ and $S_2$ of the optical wedge and front and rear surfaces $S_3$ and $S_4$ of the measured lens, and is expressed as:

$$I(x, y, k(t)) = \sum_{n=1}^{4} I_n(x, y) + 2 \sum_{p=1}^{3} \sum_{q=p+1}^{4} \sqrt{I_p(x, y) \cdot I_q(x, y)} \cos[2 \cdot k(t) \cdot \Lambda_{pq}(x, y)],$$

$$\Lambda_{pq}(x, y) = n_{pq} \cdot z_{pq}(x, y),$$

where $I_1$, $I_2$, $I_3$, and $I_4$ respectively represent light intensities of reflected light of four surfaces comprising the front and rear surfaces $S_1$ and $S_2$ of the optical wedge and the front and rear surfaces $S_3$ and $S_4$ of a measured object; $\Lambda_{pq}$ represents an optical distance difference from a surface $S_p$ to a surface $S_q$; $n_{pq}$ represents an average refractive index from the surface $S_p$ to the surface $S_q$; and $z_{pq}$ represents a position difference between the surfaces $S_p$ and $S_q$.

4. The method according to claim 1, wherein after the data processing is performed on the data acquired by the CCD camera using the interference signal correlation spectral decomposition and complex linear least squares algorithm, an interference phase $\Phi_{13}$ is extracted and demodulated, and a theory of the interference signal correlation spectral decomposition and complex linear least squares is as follows:
    after removing a direct-current component of the interference signal acquired by the CCD camera, a Euler formula is rewritten into a matrix form to obtain following formulas:

$$Q = A \cdot G + W$$

$$A = \begin{bmatrix} 1 & 1 & \cdots & 1 & 1 & \cdots & 1 & 1 \\ e^{j \cdot 2\pi \cdot f_{12} \frac{\Delta k}{N-1}} & e^{-j \cdot 2\pi \cdot f_{12} \frac{\Delta k}{N-1}} & \cdots & e^{j \cdot 2\pi \cdot f_{pq} \frac{\Delta k}{N-1}} & e^{-j \cdot 2\pi \cdot f_{pq} \frac{\Delta k}{N-1}} & \cdots & e^{j \cdot 2\pi \cdot f_{(M-1)(M)} \frac{\Delta k}{N-1}} & e^{-j \cdot 2\pi \cdot f_{(M-1)(M)} \frac{\Delta k}{N-1}} \\ e^{j \cdot 2\pi \cdot f_{12} \frac{2\Delta k}{N-1}} & e^{-j \cdot 2\pi \cdot f_{12} \frac{2\Delta k}{N-1}} & \cdots & e^{j \cdot 2\pi \cdot f_{pq} \frac{2\Delta k}{N-1}} & e^{-j \cdot 2\pi \cdot f_{pq} \frac{2\Delta k}{N-1}} & \cdots & e^{j \cdot 2\pi \cdot f_{(M-1)(M)} \frac{2\Delta k}{N-1}} & e^{-j \cdot 2\pi \cdot f_{(M-1)(M)} \frac{2\Delta k}{N-1}} \\ \cdots & \cdots & \cdots & \cdots & \cdots & \cdots & \cdots & \cdots \\ e^{j \cdot 2\pi \cdot f_{12} \cdot \Delta k} & e^{-j \cdot 2\pi \cdot f_{12} \cdot \Delta k} & \cdots & e^{j \cdot 2\pi \cdot f_{pq} \cdot \Delta k} & e^{-j \cdot 2\pi \cdot f_{pq} \cdot \Delta k} & \cdots & e^{j \cdot 2\pi \cdot f_{(M-1)(M)} \cdot \Delta k} & e^{-j \cdot 2\pi \cdot f_{(M-1)(M)} \cdot \Delta k} \end{bmatrix}_{N \times M \cdot (M-1)}$$

$$G = \left[ \sqrt{I_1 I_2} \cdot e^{-j\phi_{12}}, \sqrt{I_1 I_2} \cdot e^{j\phi_{12}}, \ldots, \sqrt{I_p I_q} \cdot e^{-j\phi_{pq}}, \sqrt{I_p I_q} \cdot e^{j\phi_{pq}}, \ldots, \sqrt{I_{M-1} I_M} \cdot e^{-j\phi_{(M-1) \cdot M}}, \sqrt{I_{M-1} I_M} \cdot e^{j\phi_{(M-1) \cdot M}} \right]^H_{1 \times (M-1) \cdot M}$$

$$W = [W_{(1)}, W_{(2)}, \ldots, W_{(N)}]^T_{1 \times N}$$

where an coefficient matrix A contains interference frequency information, a vector G contains interference phase and interference amplitude information, a vector W represents noise introduced during acquisition by the CCD camera, M is a total number of surfaces of the optical wedge and the measured lens that is 4, N is a number of shots by the CCD camera, and a vector Q represents an intensity of the interference image captured by the CCD camera, and the matrix A and the vector G are solved through the vector Q, and interference signals between respective surfaces are obtained by separation, so that the interference phase $\Phi_{13}$ containing lens profile structure information is obtained by separation.

5. The method according to claim 1, wherein a medium between a front surface $S_1$ of the optical wedge and a front surface $S_3$ of the measured lens is air, and a refractive index is set to 1, since:

$$\Phi_{13}=2 \cdot k_0 \cdot \Lambda_{13}$$

a profile $z_{13}$ of the front surface $S_3$ of the measured lens is expressed as:

$$z_{13}(x,y)=\Phi_{13}(x,y)/(2 \cdot k_0)$$

wherein the three-dimensional reconstruction is performed on the lens three-dimensional profile data to obtain a lens three-dimensional profile map.

* * * * *